TIMING CIRCUITRY IN A DRUM STORAGE COMPUTER SYSTEM

Original Filed Aug. 15, 1956 15 Sheets-Sheet 1

INVENTORS.
DONALD T. BEST
JOHN R. VAN ANDEL
BY
Kenneth L. Miller
ATTORNEY

TIMING CIRCUITRY IN A DRUM STORAGE COMPUTER SYSTEM

Original Filed Aug. 15, 1956 15 Sheets-Sheet 3

INVENTORS.
DONALD T. BEST
JOHN R. VAN ANDEL
BY
Kenneth L. Miller
ATTORNEY

TIMING CIRCUITRY IN A DRUM STORAGE COMPUTER SYSTEM

INVENTORS.
DONALD T. BEST
JOHN R. VAN ANDEL
BY
Kenneth L. Miller
ATTORNEY

INVENTORS.
DONALD T. BEST
JOHN R. VAN ANDEL
BY
Kenneth L. Miller
ATTORNEY

INVENTORS.
DONALD T. BEST
JOHN R. VAN ANDEL
BY
Kenneth L. Miller
ATTORNEY

March 19, 1968 D. T. BEST ET AL 3,374,462

TIMING CIRCUITRY IN A DRUM STORAGE COMPUTER SYSTEM

Original Filed Aug. 15, 1956 15 Sheets-Sheet 6

INVENTORS.
DONALD T. BEST
JOHN R. VAN ANDEL
BY
Kenneth L. Miller
ATTORNEY

TIMING CIRCUITRY IN A DRUM STORAGE COMPUTER SYSTEM

INVENTORS.
DONALD T. BEST
JOHN R. VAN ANDEL
BY Kenneth L. Miller
ATTORNEY

INVENTORS.
DONALD T. BEST
JOHN R. VAN ANDEL
BY
Kenneth L. Miller
ATTORNEY

INVENTORS.
DONALD T. BEST
JOHN R. VAN ANDEL
BY
Kenneth L. Miller
ATTORNEY

INVENTORS.
DONALD T. BEST
JOHN R. VAN ANDEL

BY Kenneth L. Miller
ATTORNEY

TIMING CIRCUITRY IN A DRUM STORAGE COMPUTER SYSTEM

Original Filed Aug. 15, 1956 15 Sheets-Sheet 11

INVENTORS.
DONALD T. BEST
JOHN R. VAN ANDEL
BY
Kenneth L. Miller
ATTORNEY

INVENTORS.
DONALD T. BEST
JOHN R. VAN ANDEL
BY
Kenneth L. Miller
ATTORNEY

TIMING CIRCUITRY IN A DRUM STORAGE COMPUTER SYSTEM

Original Filed Aug. 15, 1956

INVENTORS.
DONALD T. BEST
JOHN R. VAN ANDEL
BY
ATTORNEY

INVENTORS.
DONALD T. BEST
JOHN R. VAN ANDEL
BY
Kenneth L. Miller
ATTORNEY

INVENTORS.
DONALD T. BEST
JOHN R. VAN ANDEL
BY
Kenneth L. Miller
ATTORNEY

United States Patent Office 3,374,462
Patented Mar. 19, 1968

3,374,462

TIMING CIRCUITRY IN A DRUM STORAGE COMPUTER SYSTEM

Donald T. Best, Plymouth Meeting, Pa., and John R. Van Andel, Dearborn, Mich., assignors to Burroughs Corporation, Detroit, Mich., a corporation of Michigan Original application Aug. 15, 1956, Ser. No. 604,153, now Patent No. 3,144,549, dated Aug. 11, 1964. Divided and this application July 24, 1963, Ser. No. 297,348
Claims priority, application Great Britain, Mar. 2, 1956, 6,693/56
18 Claims. (Cl. 340—172.5)

This application is divided from copending application Ser. No. 604,153, filed Aug. 15, 1956, by George G. Hoberg et al., now United States Patent No. 3,144,549, which in turn is a division of application Ser. No. 492,062, now United States Patent No. 3,053,449.

This invention relates to electronic digital computers and more particularly to data storage and information location devices operable in general-purpose computers having a plurality of automatically sequenced program steps adapted to enable the computer to perform many different types of programmed operations.

In general, electronic computers have been difficult to operate and highly skilled and specialized operators have been necessary for setting up programs to enable the computer to solve the desired problems. These computers have been highly proficient in solving the problems after being properly programmed. However, the programming technique required in prior art general-purpose computers has necessitated extensive training courses, and has resulted in establishment of a few key personnel upon which the operation of the machine depends. Not only has this caused personnel procurement problems, but it reduces the duties of persons charged with the solution of problems to the mechanical routine of gathering data. This results in losing the feel for the problem and its solution and the ability to sense whether the solution is proper because all contact by the problem originator with the procedures by which the problem is carried out is broken. Even should these persons do the programming they may not understand the procedures followed in the problem solution because they have to think in terms of coded arithmetic notation rather than in terms of the decimal notation with which they are familiar. In the solution of scientific and business problems, scientists and the businessmen have not favorably reacted toward a loss in feeling for finding solutions when using electronic computers, except in those cases where a time schedule bottleneck overrides the desirability for maintaining contact with the procedures by which the problem is solved.

It is, therefore, an object of this invention to produce an electronic computer which enables an operator to maintain touch with the manner of solving a problem and yet in which the mere routine of arithmetic or recording is done automatically at high speed by the electronic computer.

Another object of the invention is to produce a simply programmed electronic computer capable of operation by unskilled personnel and designed for operation directly in decimal notation although features of the invention are not limited to such notation.

Accordingly, the electronic computer afforded by the present invention provides simplicity of operation and flexibility of control with provisions for manual operator intervention at any stage of the programmed problem. Thus, the operator may view partial results and thereafter cause the computation to proceed in accordance with intelligible judgment which cannot be done readily in the machine itself. The computer is designed to aid the operator in understanding the nature and the status of the problem as it progresses through the various automatic or optional manual control steps. Visual aids are afforded showing the condition of the machine during the different operational steps. In addition, the machine is provided with visually pinned program instructions to enable the operator at all times to recognize the program in progress. The pinboard also permits flexibility in the choice of programs and rapid changing of the computer from one program to another without danger of improper connections because of wiring complexity.

Prior art general-purpose computers have been designed which are extremely high in cost and comprise excessive amounts of equipment which utilize large amounts of power in operation. Such machines have been available to only those relatively few users who have control of unlimited funds for acquiring and operating such machines.

Accordingly, another object of the present invention is to provide a flexible small size general-purpose digital computing machine.

A further object is to provide such an electronic digital computer which is both low in initial cost and in operating cost.

In a computer of the type described, information must be stored for ready access to the computer when required. One form of a suitable memory is cyclically movable magnetic storage means such as a magnetic drum. In providing such storage means, many problems are encountered in accurately reading and writing information in specified memory locations. It is usual to provide timing pulses directly recorded upon one drum channel or track for identifying cell locations. However, certain noise signals may be induced upon the timing track during use, and accordingly erroneous operation may be encountered.

Timing signals of several different types may be recorded in separate memory channels, to thereby provide the necessary operation of different computer control circuits. It becomes cumbersome and expensive, however, to have separate tracks for all the various timing signals, and the various timing signals must be recorded upon the movable memory medium, to assure the exact timing necessary for locating stored information.

Different recorded information records must be located with computer instructions and control circuits by utilizing the recorded timing signals, and the address location circuits must be operated in proper sequence with other computer functions to properly time the presentation of information with the corresponding data processing operations. Control circuits for locating signals and the corresponding instructions heretofore have been more complex than feasible for use in low cost computers with limited program facilities. Thus, it becomes necessary to provide more efficient use of programming facilities in locating addresses of recorded information records.

Accordingly the present invention overcomes these difficulties and affords improved memory systems operable in low cost computers to accurately locate and process stored information.

An object of the invention therefore is to provide magnetic memory systems which are non-responsive to noise signals encountered in timing signal channels.

Another object of the invention is to provide a plurality of separable recorded timing signals upon the same track of a cyclically movable memory medium together with simplified control circuits for distinguishing the separate signals.

A further object of the invention is to provide simplified and flexible memory address locating circuits operable in computers having a limited number of program facilities.

In accordance with this invention, therefore, there is provided a cyclic magnetic memory device having recorded thereupon timing control signals and selectively alterable data. Processing circuits are provided for reproducing the recorded timing signals in accurate timing relationship without interference by interspersed noise signals which might otherwise interefere with computer operation. This is accomplished by converting recorded timing signals to sine wave signals in tuned circuit amplifier to thereby exclude signal components non-periodic at the fundamental timing pulse presentation frequency. Furthermore, efficient amplification is realized by employing the greater amplifier gain of a tuned circuit. Fundamental circuit timing is thereby controlled only by the periodic presentation frequency of actually recorded timing signals. Several sets of auxiliary timing control signals are recorded in at least one separate timing track for use with the fundamental timing signals to reproduce several separable sets of further computer timing control signals.

Address locating circuits are provided operable from different ones of the computer timing control signals. These address locating circuits are responsive to computer programming signals in such a way that few program steps are required for locating several memory address locations. Thus, scanning switches are provided for optional control of memory location, and these scanning switches are connected for operation by certain special computer instructions. Thereby, a sequence of memory locations may be selected by a single memory address instruction coupled with a special scanning switch instruction to thereby reduce the number of programming steps required without processing address instructions through the computer arithmetic section for modification and thereby greatly increasing the required control and data processing cihcuits.

A more detailed description of the electronic computer, organization and mode of operation together with the accompanying electronic circuits and operational features of advantage of the data storage circuits are described hereinafter with reference to the accompanying drawings, wherein.

Figures 3, 3A:
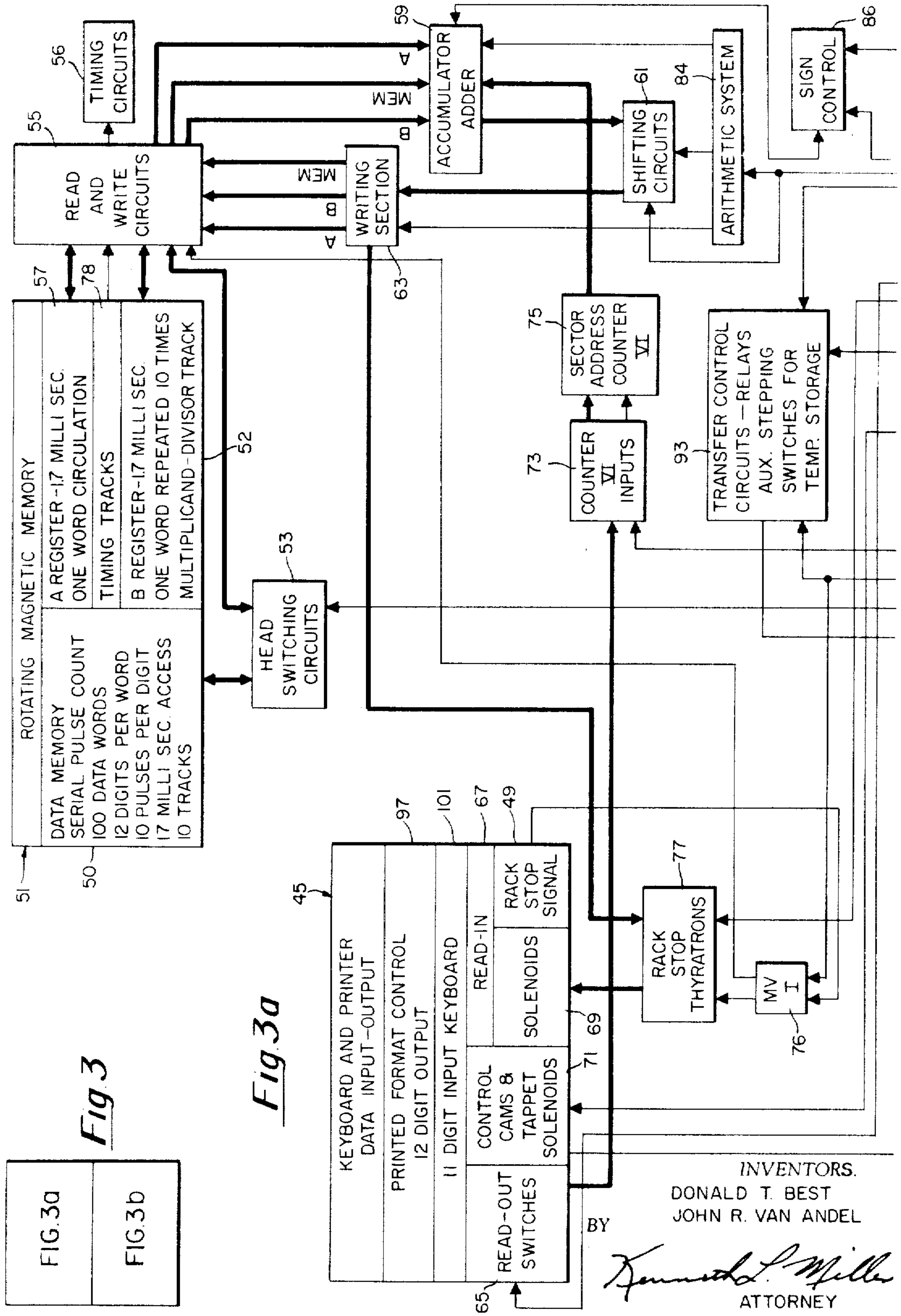
Figure 3B:
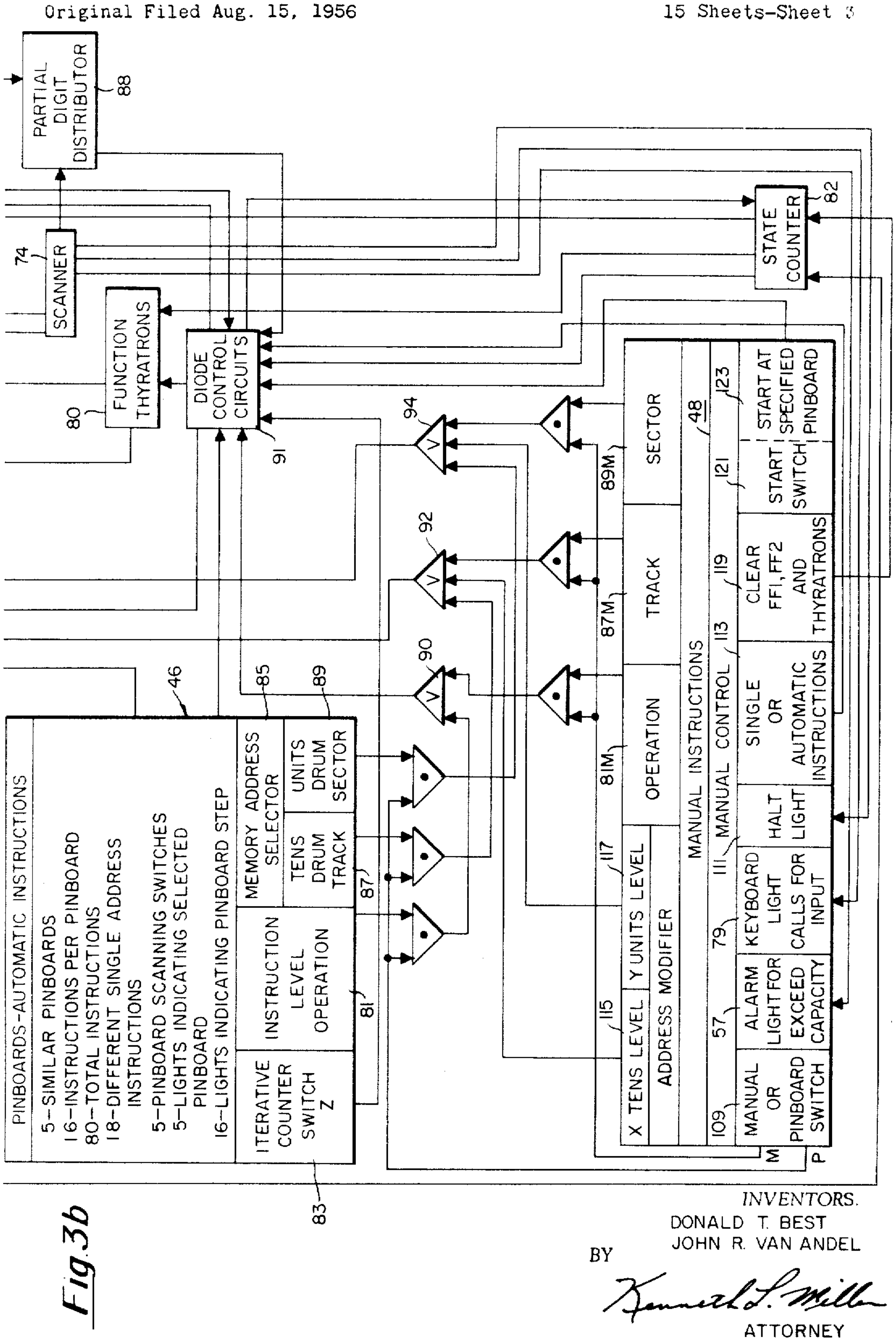
Figure 4:
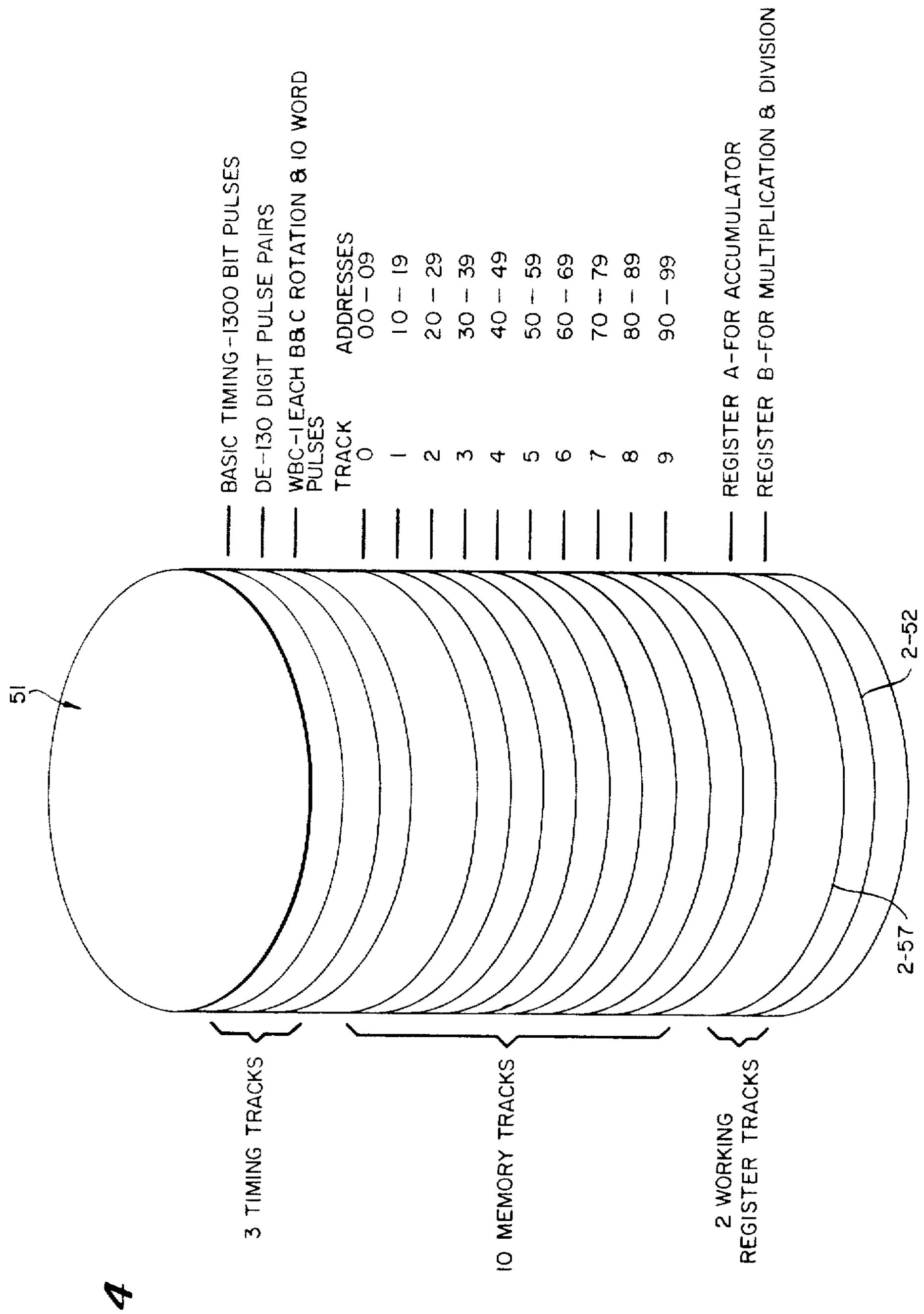
Figure 5:
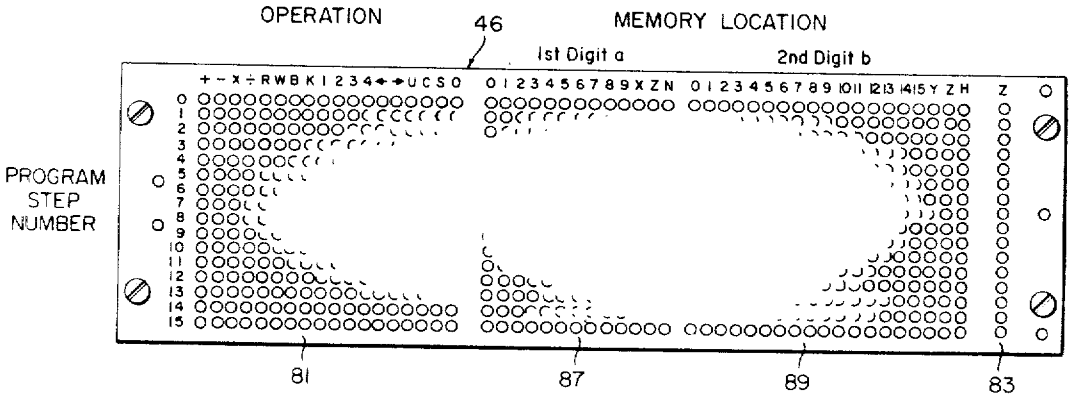
Figure 6:
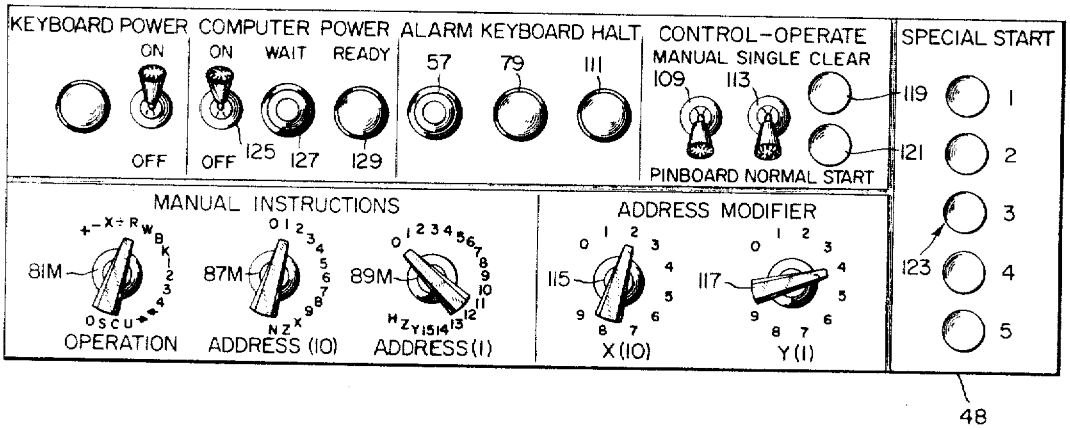
Figure 7:
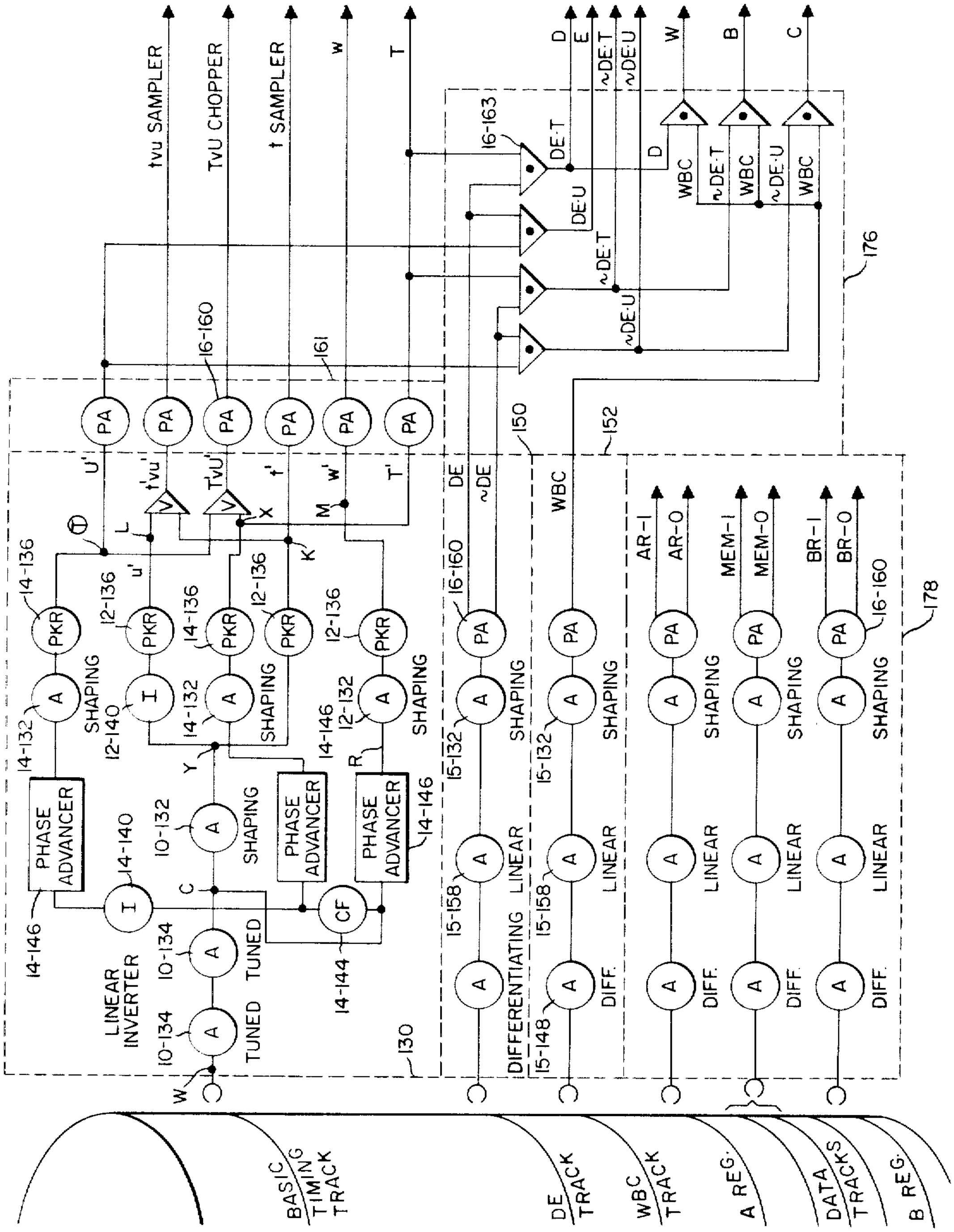
Figure 8:
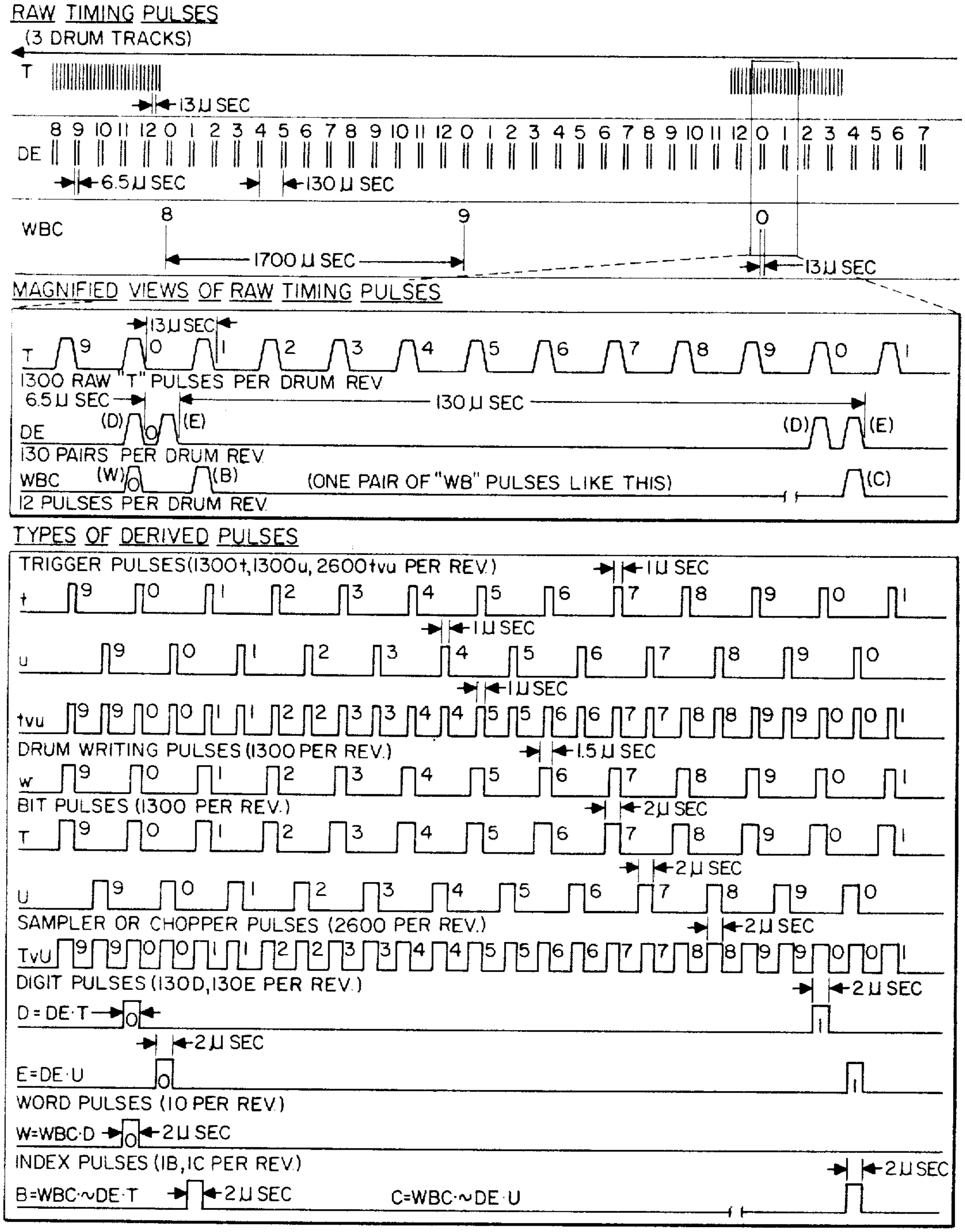
Figures 17A, 17B:
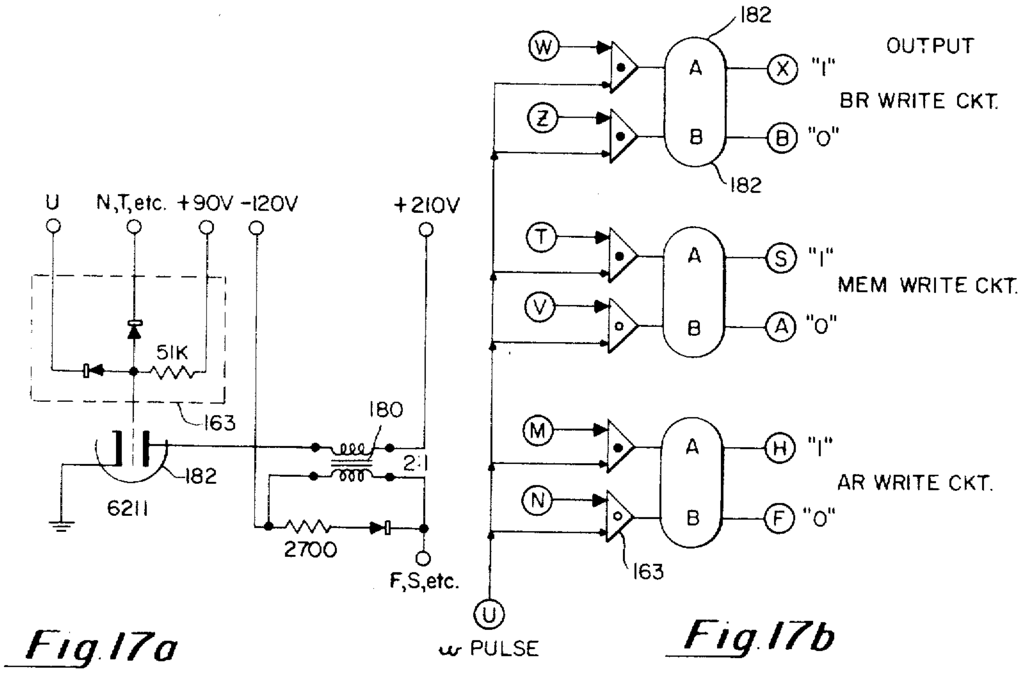
Figure 18:
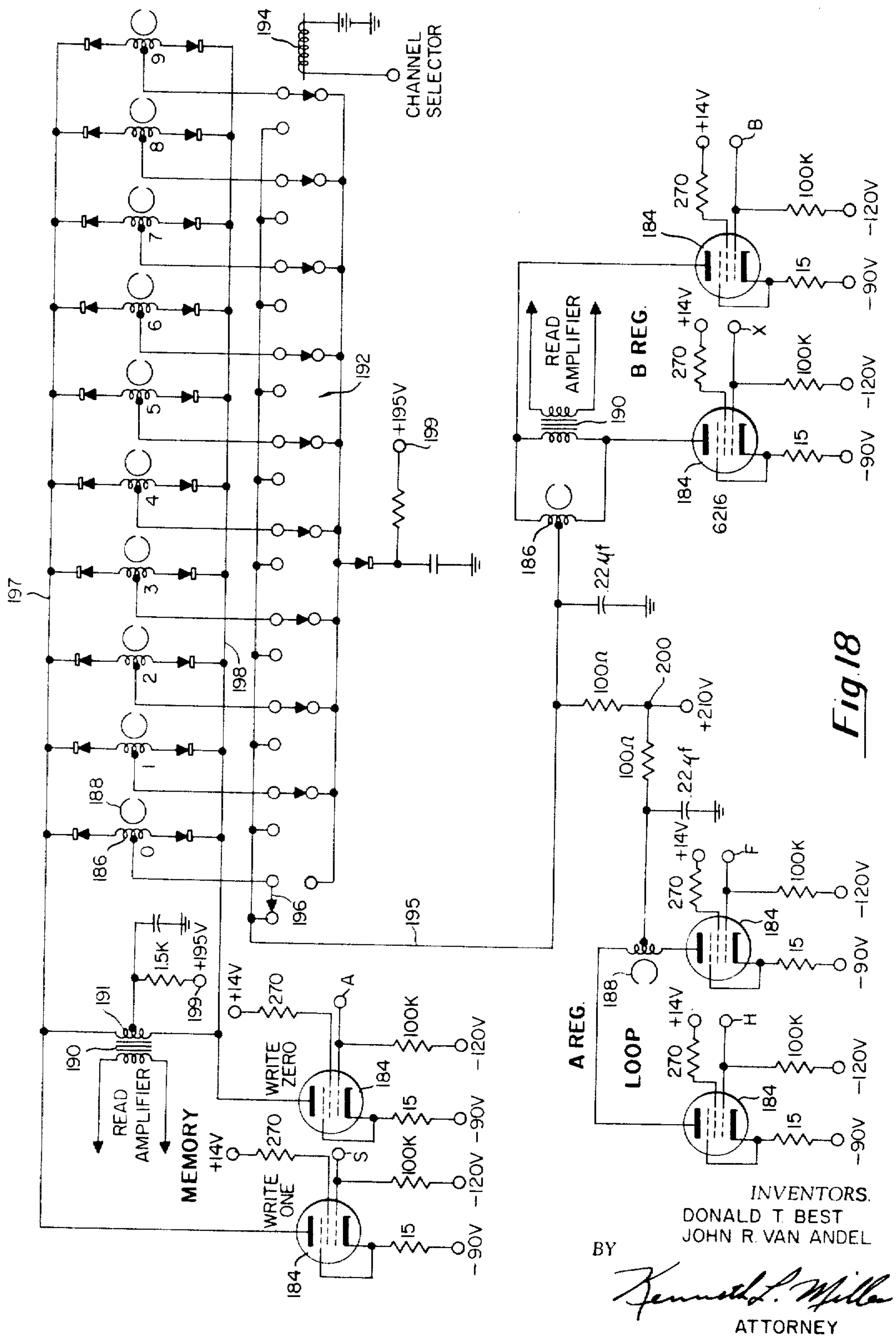
Figures 19, 19A:
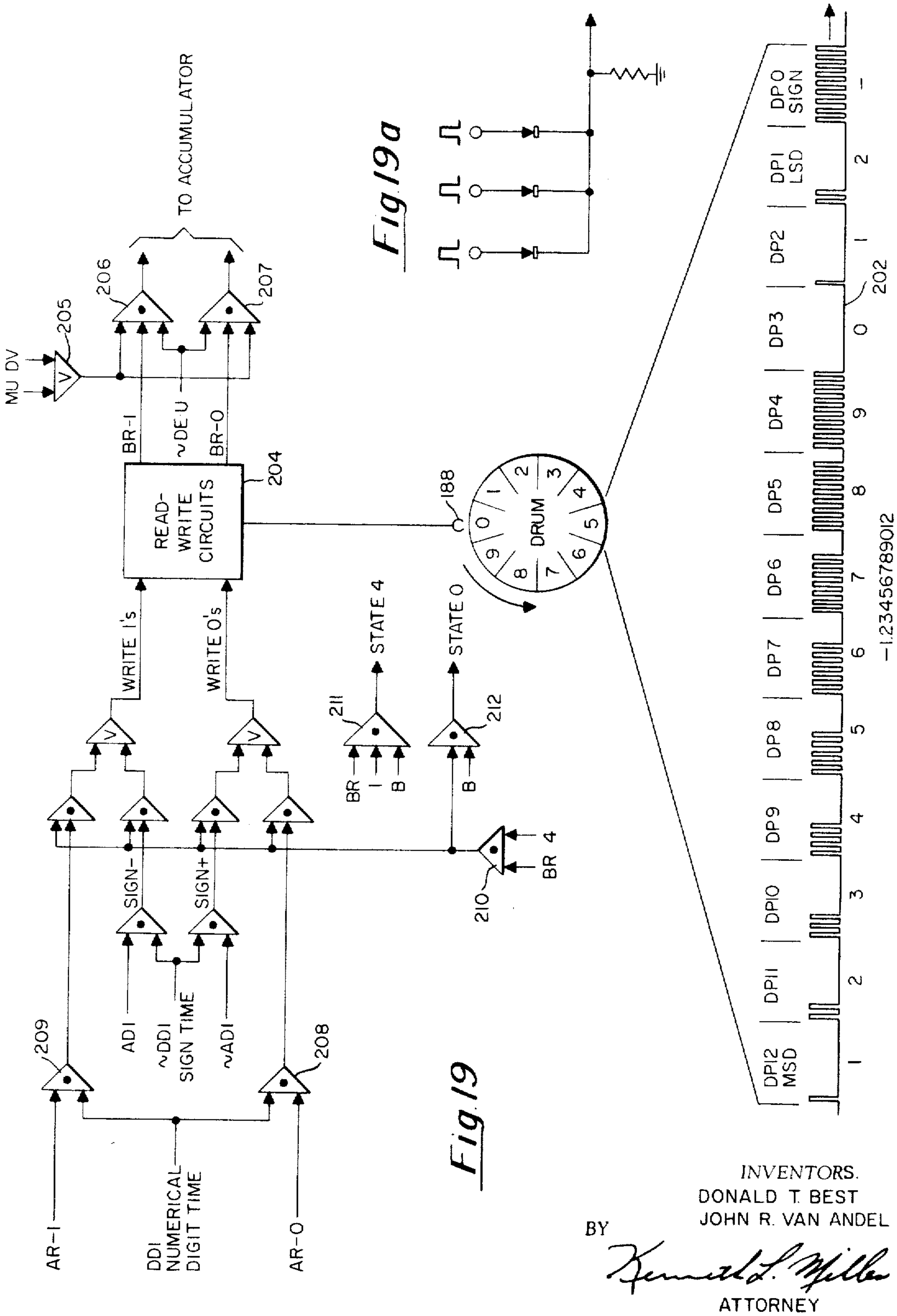
Figure 20:
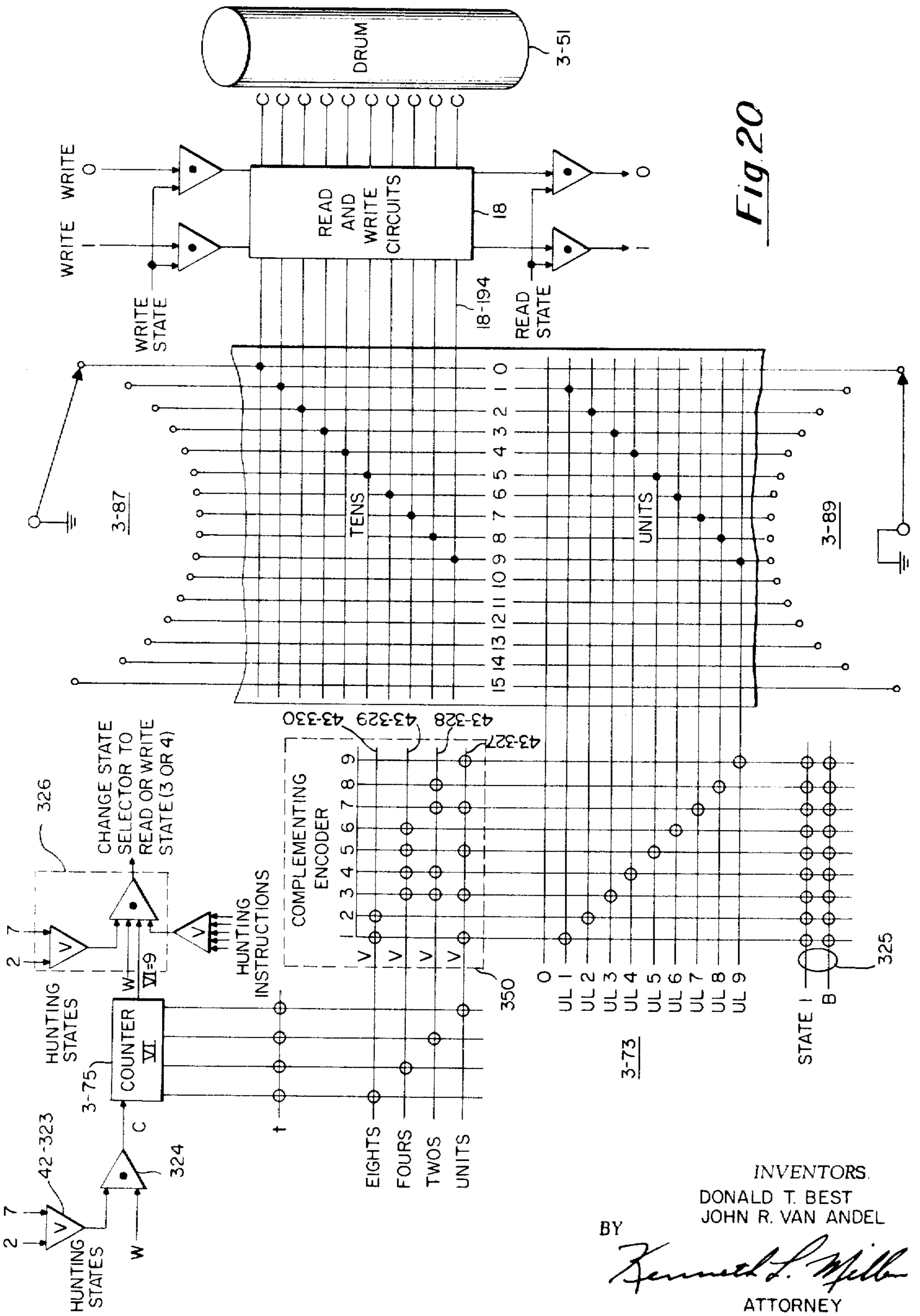

FIGS. 3, 3*a* and 3*b* show in more detailed block diagram form the relationship of different functional units of the computer;

FIG. 4 is a diagrammatic view of a magnetic drum memory device of the computer;

FIG. 5 is a plan view of a pinboard used for programming the computer;

FIG. 6 is a plan view of the computer manual control panel;

FIG. 7 is a logical block diagram of signal processing circuits for stored timing and data information;

FIG. 8 is a waveform diagram of timing pulses used in the computer for scheduling operation;

FIGS. 9 through 16 are detailed diagrams of data processing circuits shown in FIG. 7;

FIGS. 17 through 19 are schematic diagrams of memory reading and writing circuits; and FIG. 20 is a diagrammatic representation of address selection circuits.

In order to facilitate comparison of circuits throughout the computer, like elements are given similar reference characters. In the detailed description of the computer system the reference characters are referred to the figures in which they are shown by a prefix numeral, and likewise cross reference is made from reference characters of one figure to another, wherever convenient. Wherever possible, to simplify notation, alphabetical reference characters are used on terminals and localized elements. In view of the complexity of the system, descriptive legends are used in connection with some of the figures to enable corresponding circuitry to be compared without detailed reference to the specification.

Figure 1:
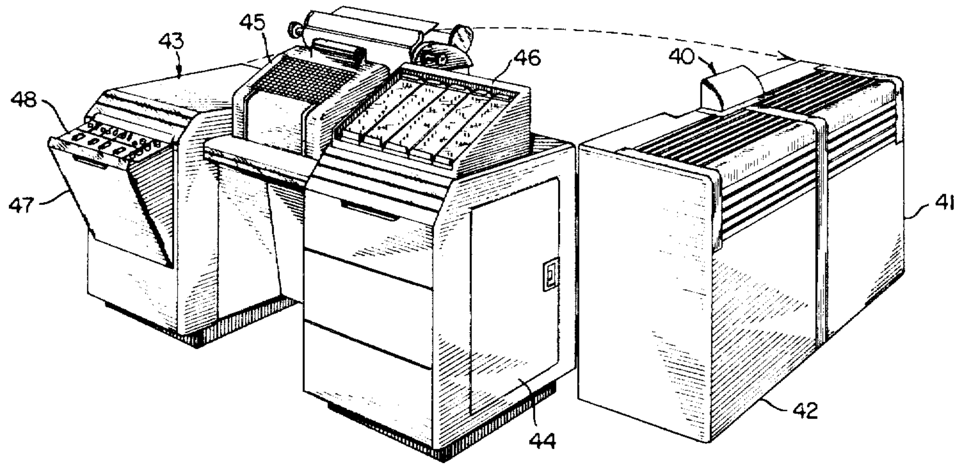
FIG. 1 is a perspective view of the electronic computer console.

In FIG. 1 is shown a perspective view of the desk-size computer console. A ventilated rear cabinet housing section 1–40 contains the electronic computer circuits which are generally mounted in standardized plug-in circuit units. The circuit housing section 1–40 pivots open for ready access in servicing the interior elements, and is further provided with removable cover sections 1–41 and 1–42 for access to circuits exposed at the rear of the cabinet.

The desk section 1–43, in general, houses the power supply and memory units, which are accessible through opposite end panels 1–44. On the desk top is affixed an input-output unit 1–45 herein identified as a keyboard-printer and a visible control panel 1–46 employing removable pins into which is programmed the automatic instruction sequence to be performed by the computer. A pivoted compartment drawer 1–47 houses a manual control panel 1–48, which may be used for setting up operation conditions in the computer and for modifying the automatic instruction sequence.

Figure 2:
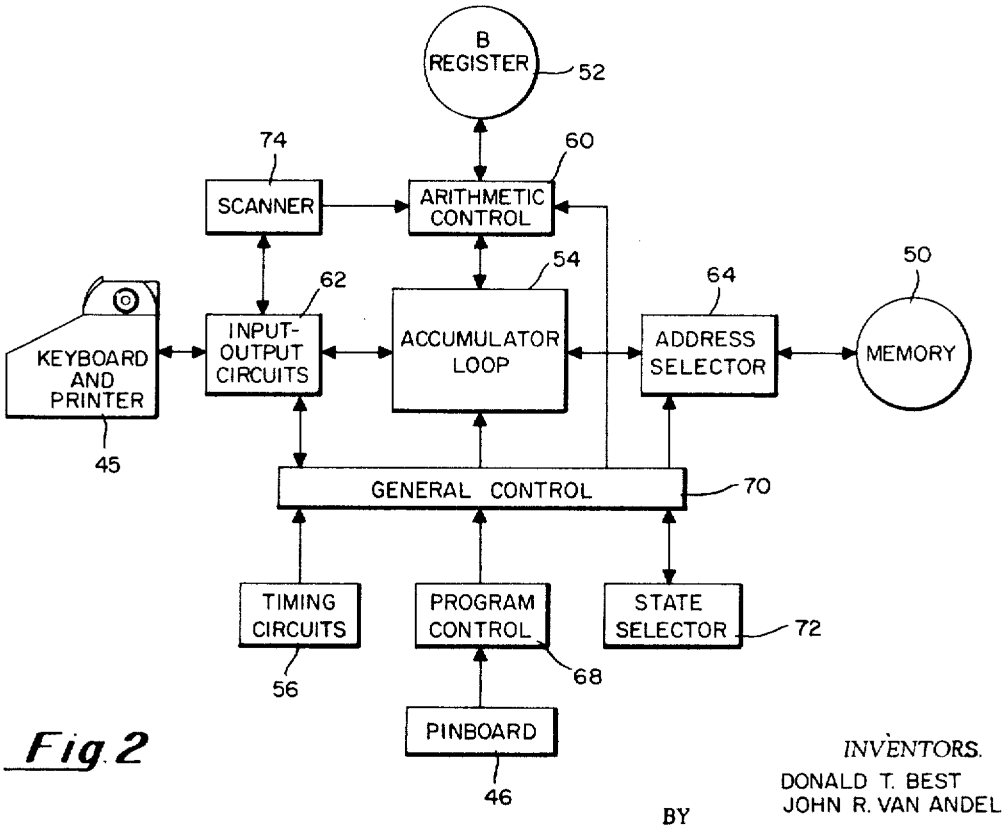
FIG. 2 is a generalized block diagram of the several functional computer sections.

The block diagram circuit of FIG. 2 illustrates the overall operational relationship of different computer units. The computer units are shown in functional rather than physical relationship. For example, the memory unit 2–50 comprises several tracks of a rotating magnetic disc or drum, while the B register 2–52 and accumulator loop 2–54 each comprise further single tracks on the same rotating storage device. The timing circuits 2–56 may be also actuated from timing signals synchronized with further tracks upon the rotating storage device. Input-output circuits 2–62 are provided to assure that the electronic computer timing circuits 2–56 and the keyboard and printer 45, which has an independent operating cycle, are synchronously sensed. In this way separate buffer memory devices are eliminated. The keyboard and printer 45 with its internal operation cycle includes further transition timing cam means not associated with the block 2–56 for enabling the transfer of information between the keyboard and printer unit 45 and the synchronously operated computer circuits. In this respect the more detailed presentation of FIGS. 3*a* and 3*b* shows that the timing cam produces rack stop signals at section 3–49 which under control of the multivibrator 3–76 serves to time the firing of the rack stop thyratrons 3–77 in response to signals at the accumulator 3–59 or read-write circuits 3–55 when accompanied by the readout instruction.

All arithmetic operations are under control of circuits within the arithmetic control unit 2–60 or the general control unit 2–70, and all data transfers through the input-output circuits 2–62 and address selector unit 2–64 make use of the accumulator loop 2–54, which comprises a regeneratively controlled data track upon the rotating storage device. The arithmetic operations are scheduled by a program set up in the pinboard 46. Each program sequence may be automatically scanned step by step with the program control circuits 2–68. The arithmetic control unit 2–60 and B register 2–52 are used primarily for multiplication and division operations, and the general control circuits 2–70 are used to schedule each of the several operations for which the computer is designed. The general control circuits operate from a scheduled selection of eight different computer states set up by the state selector unit 2–72.

The scanner unit 2–74 counts the decimal digits of a numerical word. It is used to enable the keyboard digit to be read into the accumulator synchronously, and also is used in multiplication and division to choose the proper multiplier and quotient digits respectively. Thus, the input keyboard-set signal may be statically held until the final use has been made of an input word and therefore internal storage registers are unnecessary for the input word.

A more detailed block diagram organization of the computer is shown in FIGS. 3*a* and 3*b*. The heavy lines of FIG. 3*a* indicate information processing paths, whereas the lighter lines indicate control signal paths. As with FIG. 2, each of the block units of FIG. 3 will hereinafter be described in detail and will be identified in different figures where feasible with similar reference characters. The computer described in FIGS. 3*a* and 3*b* has functional block units assembled in a computer circuit typifying the details of a typical model of a computer constructed in accordance with the invention. Thus, it is readily seen that the typical details described in connection with some of the units may readily be modified by those skilled in the art without departing from the spirit or scope of the present invention. Certain such specific departures such as the amount of storage and number of instructions available in different computer models will be later described.

In the rotating magnetic memory unit 3–51, each data word has twelve decimal digits plus sign and is stored in serial form so that the sign may be read first and then the least significant digit, etc., as shown in FIG. 19. Each digit is stored in pulse-count form with 10 memory bit cells allocated for each digit. The tenth spacer cell located between two successive digits is not used for bit storage since the digits from zero through nine need only nine of the ten available bits.

A typical rotating memory device is the magnetic drum 51, which is diagrammatically shown with associated memory tracks in FIG. 4. This magnetic drum when rotated at about 3,600 r.p.m. provides scanning time for one track revolution of about seventeen milliseconds. Thus, the access time for one of the ten words stored in equidistant peripheral arcs or sectors around each track is about one and seven-tenths milliseconds.

The data memory comprises ten drum memory tracks each storing ten words for a total of one hundred word memory. Each track is given an address comprising a tens decimal digit (10') and each word sector is given an address comprising a units decimal digit (10°) so that the entire one hundred word memory address may be signified by a decimal number from zero to ninety-nine. Each data track has a separate magnetic read-write head which is selected by the head switching circuits 3–53 under control of a programmed address track selector digit. The recorded drum information, which is read, is then passed on to the read and write circuits 3–55 for amplification and processing. Likewise, computer information to be written on the memory is passed through the read and write circuits 3–55.

The drum, in addition to the memory tracks, is provided with two working register tracks. The B register track 3–52 has one word repeated ten times for use as the multiplicand or divisor in the multiplication and division operations. Thus, each multiplier word has a read time of one and seven-tenths milliseconds, and reading from the drum may start at the closest word position. The A register track 3–57 is a circulating one word track, which also provides a read time of one and seven-tenths milliseconds from the start of the word. This track 3–57 is connected in the accumulator loop to serve as an accumulator register.

Three separate timing tracks are provided in the timing storage memory sections 3–78 for the bit, word, digit and rotation timing or flag pulses. There are 1,300 bit timing pulses on the basic track thus serving, at 3,600 r.p.m., to produce a 78 kilocycle basic computer operating frequency. This provides for ten words of twelve decimal digits plus sign in the pulse-count notation on each track. The WBC track produces ten word pulses and one each B and C rotation or flag pulses, which are distinguished in the manner shown in the timing chart explained hereinafter in connection with FIG. 8. The B pulse coincides in time with the T pulses on the basic timing track and the C pulse is spaced between two T pulses for presentation at U time one-half drum revolution from the B pulse. It may be noted in FIG. 8 that the time axis for the pulses derived from the WBC track is broken to show the C pulse which occurs half a drum revolution, or 650 bit timing T pulses, later than the B pulse. It will appear from the above that the C pulse thus occurs five words later than the B pulse, each word having 13 decimal digits of ten bits each. The DE timing track provides 130 digit pulse pairs for each drum rotation. Thus another W pulse occurs simultaneously with a D pulse shortly before the C pulse occurs. To make the C pulse come at U time instead of T time, the C pulse, of course, has to occur slightly longer after its W pulse than did the B pulse after its W pulse. This additional delay of the C pulse also prevents coincidence of the C pulse with an E pulse, as is necessitated by the logical operation for isolating the C pulse, represented at the extreme lower right corner of FIG. 7. The same logical operation is summarized in the graph on the right side of the bottom line of FIG. 8, where the time axis also is broken and does not coincide with most of the other graphs on that figure but does coincide with the timing of the C pulse shown on the WBC track, mentioned above. The timing signals are passed from the timing track section 3–78 through the read and write circuits 3–55 to the timing circuits 3–56 which are used to synchronize operations by gating signals at local circuit positions throughout the computer.

For translation of data between the rotating memory 3–51 and other computer units, all data is processed through the read and write circuits 3–55 and the accumulator 3–59. The accumulator principally comprises a serial pulse-count adder circuit, which is coupled in a loop circuit with the A register memory track 3–57 through the shifting circuits 3–61 and writing section 3–63. Data may also be transferred between the memory unit 3–51 and the keyboard and printer 45 by way of the accumulator 3–59 and writing section 3–63.

The keyboard and printer 45 may be incorporated in a standard business machine of the type described in the United States Patent No. 2,629,549, issued Feb. 24, 1953, to T. M. Butler for "Automatic Function Control Mechanism for Accounting Machines." This machine provides a selectable printed format control from a semi-ganged high speed printer by means of a mechanically programmed control tray in the machine. Thus, a printed page may be produced directly from the electronic computer circuits in any desired type of format. Each printed output word will have twelve decimal digits plus sign and the keyboard has eleven input digits. The read-out conversion from the business machine keyboard to an electronic circuit is accomplished by read-out switches 3–65 as described and claimed in the application for United States patent for "Switch Mechanism," by William Ward Deighton, filed Jan. 6, 1955, Ser. No. 480,266, now abandoned, and assigned to the same assignee as the present application. The read in section 3–67 transfers data from electronic computer circuits to the printer by means of solenoids 3–69 which serve to stop the business machine printing racks in a desired position in the manner described in United States Patent 2,822,752, issued Feb. 11, 1958, to R. S. Bradshaw et al., for "Differential Type Setting and Resetting Means," and assigned to the same assignee as the present application. Since the business machine operates on its own internal read-out and print cycle which is asynchronous with the operation of the rotating magnetic memory in the computer, the control cam and tappet solenoid section 3–71 is provided for transition timing of the keyboard and printer operations with the function thyratron circuits 3–80 and the state counter 3–82 shown in FIG. 3*b*. This control section 3–71 is described in the United States Patent No. 2,836,355, issued May 27, 1958, to O. W. Banik et al., for "Remote Function Control System," and assigned to the same assignee as the present application.

Data is transferred from the keyboard through read-out switches 3–65 and by way of the counter VI input circuits 3–73 and the sector address counter 3–75 to the accumulator 3–59. Conversely, data is transferred from the computer to the printer from the writing section 3–63 through the rack stop thyratron circuits 3–77 and the rack stop solenoids 3–69. All of the data processing units and paths described may be placed under control of either automatic or manual computer sections 3–46 or 3–48 by prescribed instructions.

The timing circuits 56 of FIG. 3*a* are used to reform and gate signals throughout the computer to ensure operation upon the proper data and to maintain synchronism in the computer.

All of the arithmetic operations are timed by means of signals derived from stored timing signals in the memory section 3–78 with circuits located in the read section 3–55 and processed in the timing circuit section 56 of FIG. 3. These timing circuits are shown in more detailed block diagram form in FIG. 7. The corresponding waveforms are illustrated in FIG. 8, and detailed schematic circuits are found in FIGS. 9 through 16. The block diagram circuits of FIG. 7 are discussed together with timing pulse characteristics of both the raw recorded pulses and those timing pulses derived therefrom as indicated by the waveforms of FIG. 8.

The basic timing track has 1,300 raw timing pulses T spaced at thirteen microsecond intervals which are used to derive pulses for synchronous operation of the computer at bit frequencies of either 78,000 or 156,000 cycles per second. The raw timing pulses T are used in the basic timing section 7–130 for deriving a series of shaped pulses *t, u, tvu,* T, U, TvU, and *w*. The timing and widths of these pulses, together with an indication of the timing of the decimal pulse count notation in the computer system are seen in the waveforms of FIG. 8. From the corresponding letter notation at the output leads of the basic timing section 7–130 each timing signal may be traced back to the basic timing track through the processing circuits, which may be constructed as shown schematically in detail in FIGS. 9 through 16.

Figure 9:
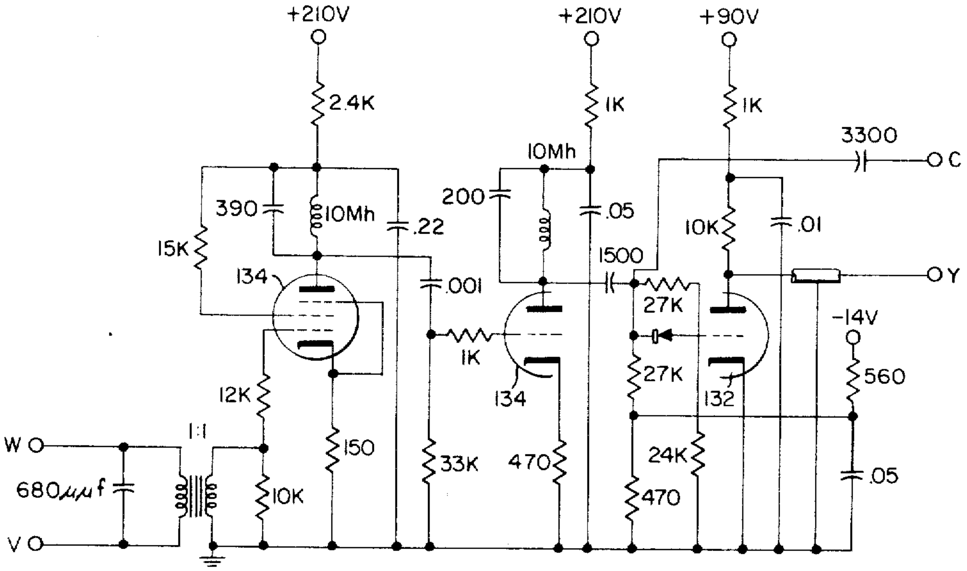
Figure 10:
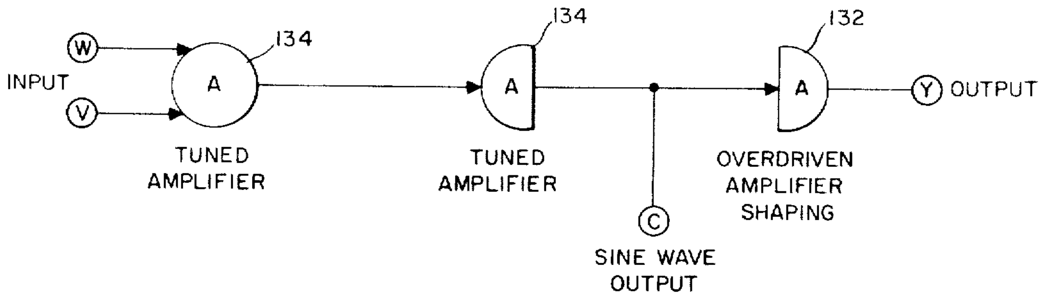
Figure 11:
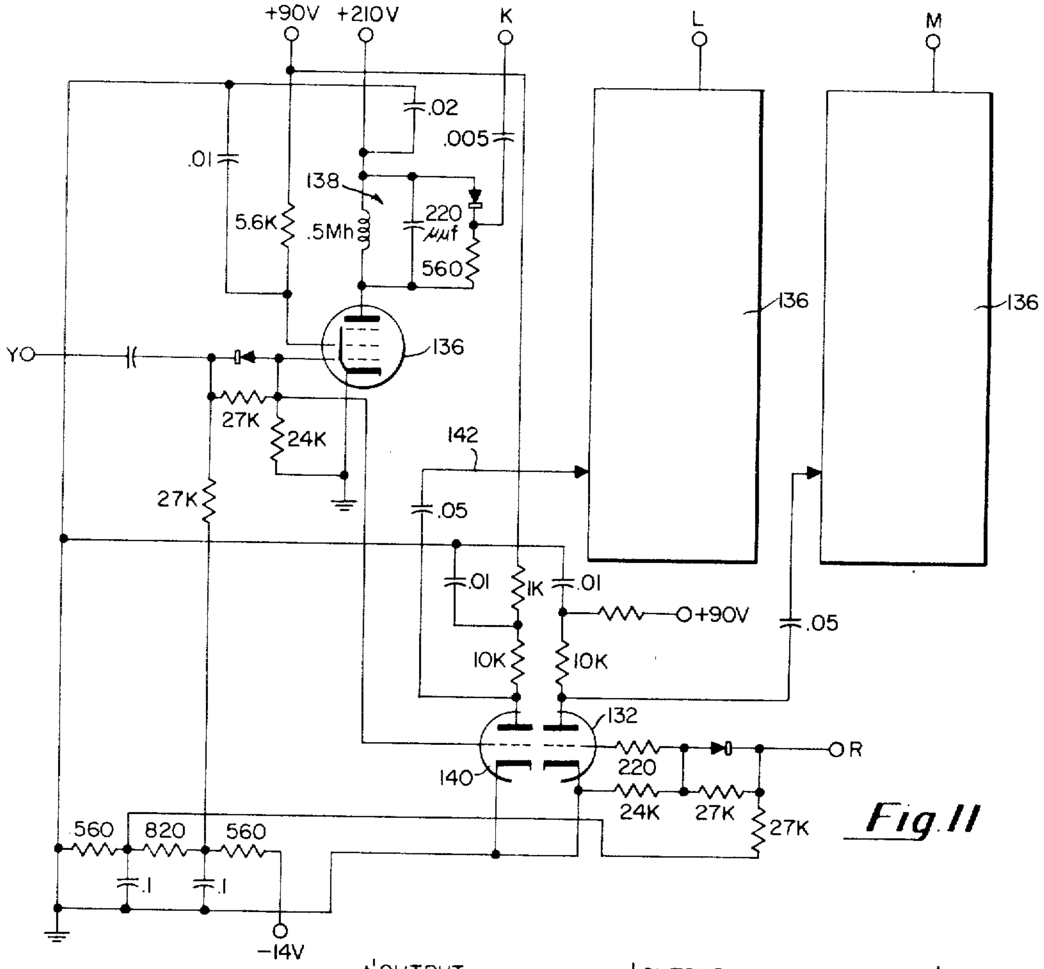

Thus, in FIG. 7, the raw basic timing pulses T are fed through the two stage tuned amplifier circuit 10–134 of FIG. 10 to produce a sine wave output signal at terminal C. The block notation of FIGS. 10, 12 and 14 may be compared with that of the basic timing processing circuits 130 of FIG. 7 to indicate the manner in which the circuits of FIGS. 9, 11 and 13 are employed. Shaping of the sine wave signal at terminal C is performed by overdriving a biased triode amplifier 9–132 in a circuit providing lowered plate potential from the +90 volt supply. This effectively converts the sine wave output signal of the intermediate tuned amplifier 9–134 to a shaped wave at the output terminal Y of the overdriven shaping amplifier 9–132, from which is derived in further circuits the one microsecond wide *t* and *u* pulses of FIG. 8.

Figure 12:
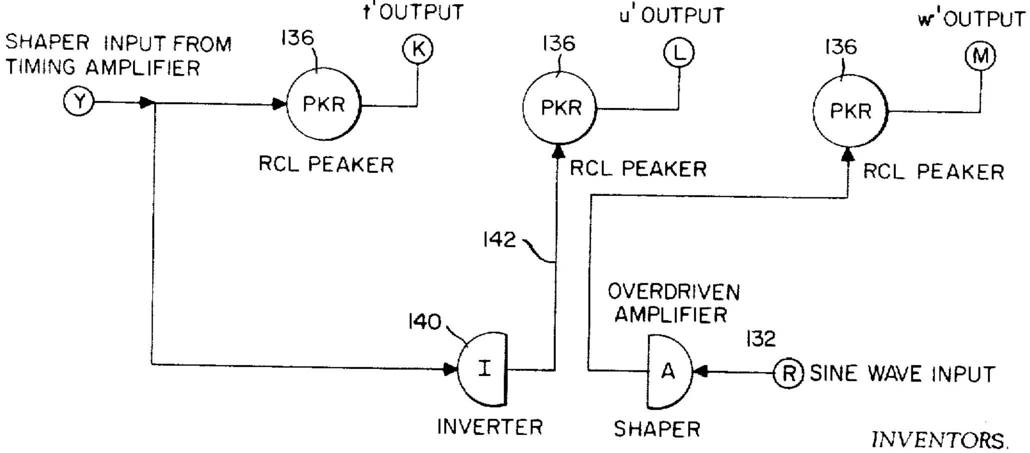
Figure 13:
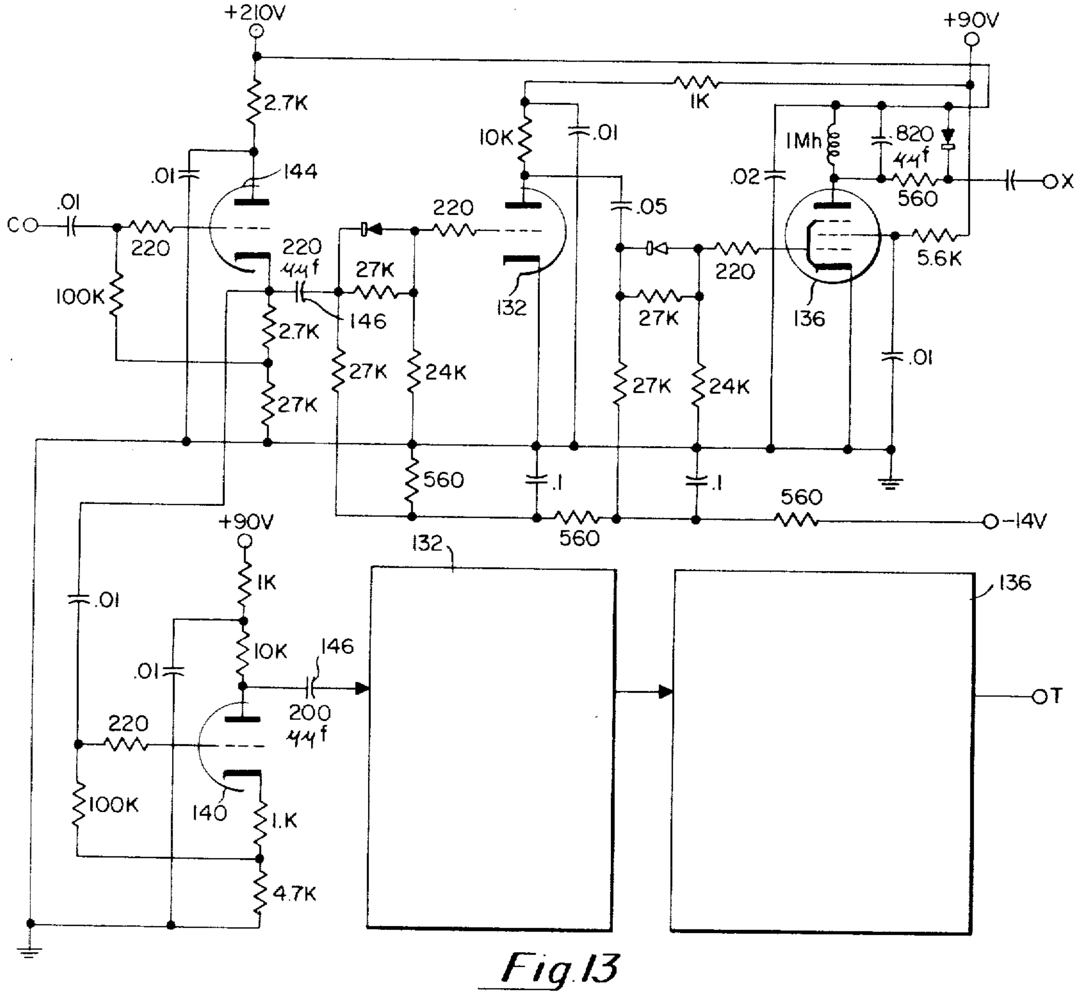

The shaped wave at terminal Y is further processed in the circuits of FIG. 11, as shown diagrammatically in FIG. 7 and FIG. 12. Thus, the pentode amplifier tube 12–136 serves as a further peaking circuit to produce at the output terminal K the *t'* timing pulse. The peaking is done in a damped resonant pulse forming circuit 11–138.

To form the *u'* timing pulse, an inverter circuit comprising the triode amplifier 11–140 is used to produce an input signal at lead 11–142 to a further pentode peaking circuit 11–136 to produce at the output terminal L the shaped *u'* timing waveform. Thus, by utilizing the reverse half cycle of the available shaped sine wave, the *t* and *u* clock pulses are caused to be interspersed with each other, as shown in FIG. 8.

The *w'* drum writing signal also is derived from the sine wave signal at terminal C. The signal at the input circuit terminal R of the overdriven amplifier 12–132 in the *w'* signal processing circuit is advanced by means of a suitable phase advancing circuit, such as 13–146, which causes the *w'* timing pulse to have a leading edge starting one-half of a microsecond before the corresponding *t'* pulses. The damped resonant pulse forming circuit is tuned to produce a one and one-half microsecond pulse. Thus, the *w'* pulses last for a duration of one and one-half microsecond, and are therefore suitable for actuating circuits for writing upon the magnetic drum. In the computer system these wider pulses permit the storage of more energy. The peaker stage 12–136 further shapes the *w'* waveform to produce output pulses at terminal M.

Figure 14:
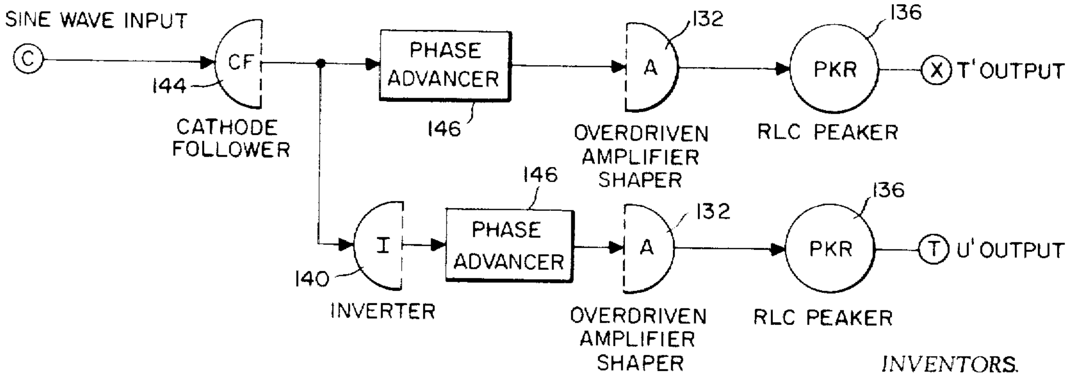
Figure 15A:
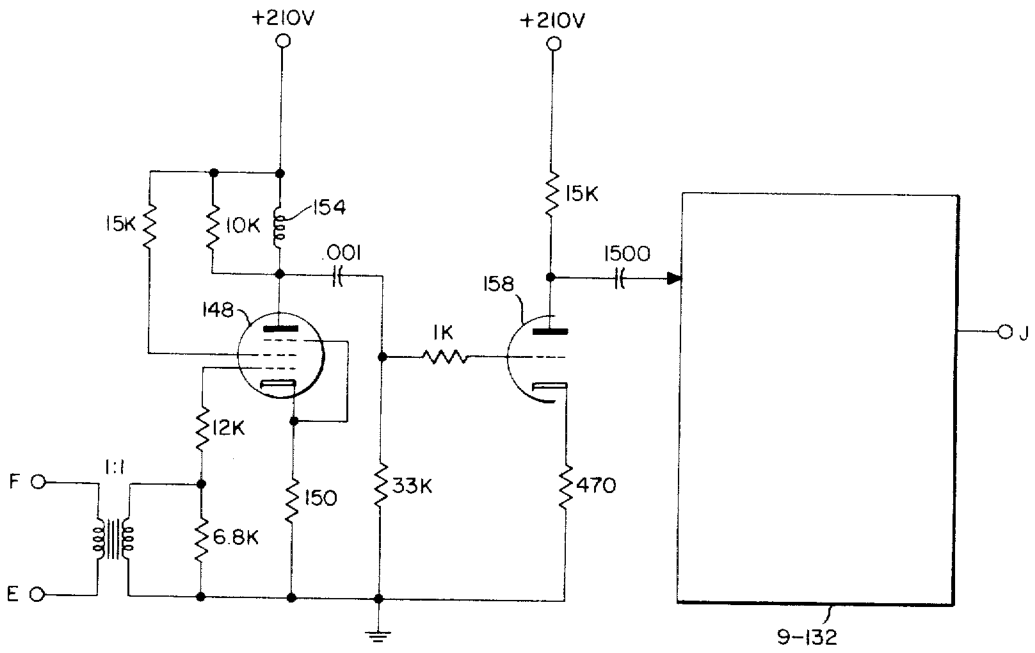
Figure 15B:
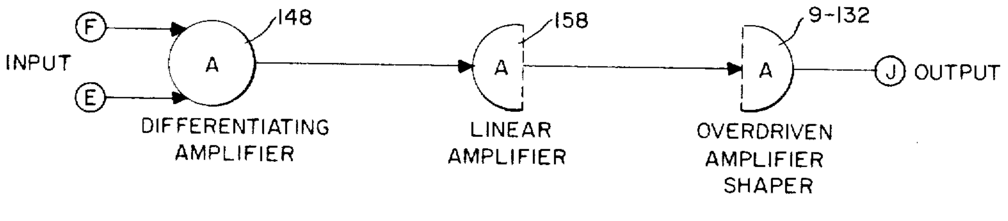

The further two microsecond wide clock pulses T' and U' are derived in circuits of the type shown in FIGS. 13 and 14 from the sine wave produced at the input terminal C. A cathode follower circuit 14–144 couples the sine wave signal to two separate processing channels for the respective clock pulses T' and U'. An inverter circuit 13–140 serves to intersperse the U' pulses with the T' pulses by utilizing a different half cycle of the sine wave input signal. By means of the interspersed phase advancing circuits 13–146, the sine wave signal is caused to trigger off the overdriven amplifiers 13–132 soon enough to cause the T' and U' pulses to be derived for two microseconds of which the latter microsecond corresponds with the *t'* and *u'* trigger pulses. The phase advancing circuits comprise simply the input R–C coupling circuit to the overdriven amplifiers 13–132 comprising the 220 micromicrofarad capacitor 13–146. The pulses are finally shaped in the peaker circuits 13–136 to produce at the respective output terminals X and T the shaped T' and U' pulses.

Some of those circuits described in connection with the basic timing processing circuits 7–130 are likewise used for processing the other timing track and data track signals in sections 7–150, 7–152 and 7–178 of FIG. 7. A differentiating amplifier 15–148 is used in the memory reading stage of the amplifier circuits in reading sections 7–152 and 7–178 of the type shown in detail in FIG. 15. Thus, the pentode tube presents a high resistance and the choke 154 has a low inductance so that the output pulses are differentiated as applied to the cascade coupled linear amplifier circuit 15–158. The pulses are then shaped in the overdriven amplifier 132 to produce output signals at the terminal J. The differentiating amplifier provides a maximum output in coincidence with the maximum flux density of the memory track.

Figure 16:
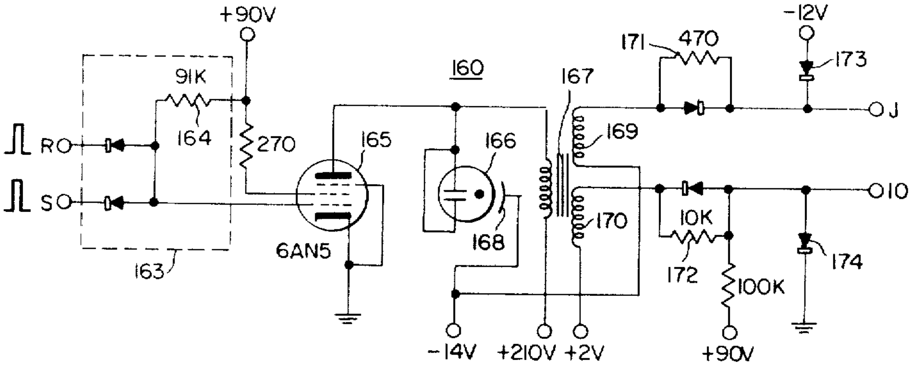
Figure 16A:
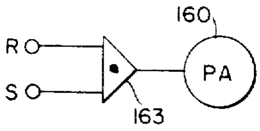

These shaped signals are further processed through the pulse amplifier circuit 16–160 (FIG. 16*a*) as are the signals derived from the basic timing track as indicated in the pulse amplifier circuit portion 7–161. The amplifier circuit of FIG. 16 is shown in universal form so that it may be utilized throughout the computer wherever pulse amplification is necessary. This is particularly true in some of the diode logic circuits. As is well known, after a pulse has passed through several diode logic stages, inherent circuit delays cause the pulse to be spread out and misshaped. Thus, fresh timing of the input signals with an appropriate clock pulse is accomplished by means of the diode "and" circuit 16–163. This "and" circuit is a conventional circuit comprising two diodes which serves as the input circuit for the 6AN5 pulse amplifier tube 16–165 coupled by resistor 164 to a source of positive potential (+90 v.) and is supplied with a source of positive input pulses at either one of the two diode cathode input terminals R and S. Thus, both diodes have to be cut off in order to produce a positive output pulse at the control grid of the pulse amplifier tube 16–165. Throughout the following specification and circuit embodiments, gates constructed schematically as those gates 16–163 are shown in the logical form of FIG. 16*a*. Thus, the "and" circuits 163 of FIG. 7 may be of this type. It is to be recognized, of course, that more than two input signals can be afforded by likewise connecting more diodes and input terminals to the resistor 16–164 in the same sense. Thus, the coincidence of all input signal pulses will produce a single output signal pulse.

The coincident pulses are simplified by the tube 16–165 and are coupled to the pulse transformer 16–167. In order to provide standard pulses for use in inhibiting as well other logic functions throughout the computer, two secondary windings 16–169 and 16–170 are used respectively for producing positive and negative output pulses.

All the pulses produced are of an amplitude of about twelve to fourteen volts, since this potential produces the highest back resistance in the crystal diodes used for logic and clamping purposes.

In each of the secondary windings 16–169 and 16–170, a 2 volt differential is provided across the diode circuits in order to produce a threshold for eliminating small transient noise signals. The output signals are respectively clamped at −12 volts and ground potential. Also in order to produce high quality pulses without transient ringing, the resistors 16–171 and 16–172 serve together with the clamping diodes 16–173 and 16–174 connected in series therewith to critically damp the secondary windings for a single half cycle of oscillation. Thus, with the described circuit the input waveforms are accurately retimed by the input "and" circuit 16–163 and are produced in amplified form by the pulse amplifier circuit 16–160 to produce shaped output pulses at the pulse transformer 16–167.

The various combinations of timing pulses which are necessary at different stages of the computer for proper operation are derived in the "and" circuits of the processing section 7–176 of FIG. 7. Since digital information is handled throughout the computer system, the data tracks derive similar shaped pulses in the power amplifier circuits 16–160 of the data section 7–178.

Neon tube indicator devices 16–165 are used to indicate the presence of pulses at transformer 16–167. A capacitive coupling member 16–168 outside the tube envelope permits pulsating energy to discharge the tube and provide a visual indication useful in servicing throughout the computer system. This device is described in United States Patent No. 2,970,303, issued Jan. 31, 1961, to Robert J. Williams, for "Neon Lamp Indicator Device," and assigned to the same assignee as the present application.

The recording of information upon the magnetic drum is in general accomplished with the same magnetic transducer heads as used for reading by means of circuits described in FIGS. 17 through 19. The basic information to be written upon the drum is derived at input terminals M, N, T, etc. of the logical "and" circuits 17–163 of FIG. 17 and are timed by means of the *w* drum writing pulses at the input terminal U of the diode "and" circuits 17–163. Thus, a pulse is derived at the output transformer 17–180 of the amplifier tube 17–182 which has a duration of one and one-half microseconds, and which is used in the output data writing circuits at terminals F, H, S, etc., for the respective three drum channels which comprise the B register or multiplication-division write circuit, the data write circuit, and the accumulator or loop write circuit. Throughout the writing channels, return to negative magnetic recording techniques are utilized. Thus, the circuits are designed to separately write digital information in the form of both 1 and 0 digits. Each writing preamplifier 17–182 comprises a half of a 6211 type duotriode. By means of selected input signals, each duo-triode tube is designed to write only one of the signals 0 or 1 necessary for writing a bit of information on the drum. In this manner, when writing, one-half of each triode is conducting each time one of the drum writing pulses *w* occurs. The circuits are designed to operate at a continuous drum writing frequency of 1,300 pulses per drum revolution so that a series of either 0 or 1 data signals may be recorded.

The actual drum writing circuits by which the output signals of pre-amplifiers 17–182 are coupled to the magnetic writing heads are shown in FIG. 18. The drum read-write circuits are shown for the three separate data sections of the magnetic drum. These sections, namely the memory or data tracks, the A register loop and the B register track each have provisions for reading and writing magnetic information upon the drum. In each of the three data sections similar read and write amplifiers are utilized for writing alternatively 1's and 0's as specified by output signals from the circuits shown in FIG. 17*b*. Each of the writing amplifiers 18–184 comprises a 6216 type pentode tube, which is coupled to one-half of a magnetic transducer head winding 18–186. By center tapping the winding 186 of the magnetic head and driving it at opposite ends with separate amplifier tubes, 1 and 0 signals may be written upon the drum alternatively.

Since the A register circuit comprises a circulating loop for re-entry of information upon the same memory track after suitable modification, a separate reading head is spaced a fixed distance of about one computer word from the loop writing head 188. However, in the B register and memory sections the same magnetic head winding is used both as a reading and writing head. In order to couple the signal to succeeding amplifier circuits from the single magnetic head, a read amplifier transformer 18–190 is coupled with its primary winding in shunt with the magnetic head windings 18–186.

A single head is coupled with each magnetic drum track, with the exception of the A register track which is coupled for re-entry of information. Separate reading and writing heads are provided for the A register loop. In the memory section there are ten data tracks 0 through 9, each of which may be individually selected so that reading and writing may be accomplished upon only one track at a time. Thus, a single read and write circuit is provided for the entire memory section. The particular memory track is selected by setting up the switch section 18–192 by means of address selection instructions from either the hereinbefore described pinboard 3–46 or the manual control panel 3–48. The tens level digit 0–9 of the selected instructions, for example, may operate a channel selector relay 18–194 individual to the magnetic head of each track in order to operate the associated single pole-double throw switch contact. Only one switch contact, such as 18–196, is connected to the +210 v. terminal 200 at a time, therefore permitting the selection of only one track such as the 0 track shown in the drawing.

In this selection scheme, each memory section reading head 18–188 has its associated winding 18–186 coupled to two opposite buses 18–197 and 18–198 by means of poled unidirectional devices such as the illustrated diodes. A cutoff bias is supplied to these diodes by way of the unselected windings of tracks 1 through 9 which apply to the respective head winding center tap terminals the +195 volts available at the power supply terminal 18–199. This supplies to the unselected diode anodes a potential of about 15 volts negative with respect to the +210 volts available at power supply terminal 18–200 which is coupled to buses 197 and 198 through the winding of the 0 track head selected by switch contact 196. Thus, each of the diodes of the non-selected heads presents maximum reverse impedance so that little current flows therethrough. Accordingly, potentials which are generated in the non-selected windings with signals presented by rotation of the drum are not transferred to buses 197 and 198 where they may be seen by the reading amplifier transformer winding 191, nor will conduction of one of the memory write amplifiers 184 cause current to flow in any unselected winding to produce undesired writing upon the drum. However, when the input signals are applied to one of the write amplifiers 184, electron current is caused to flow from the −90 volt amplifier cathode potential through the respective amplifier tube 184 and the corresponding section of the selected reading winding 186 to the switch contact 196 and back through the +210 volt power supply terminal 200. In this manner, a single read-write amplifier circuit may serve for a plurality of memory data channels in the computer system. This circuit is described and claimed in United States Patent No. 2,932,008, issued Apr. 5, 1960, of George G. Hoberg, for "Matrix System," and assigned to the same assignee as the present application.

In order to read from the plurality of memory channels, the read amplifier primary winding 191 is coupled to a +195 volt power supply terminal 199. This assures a current flow from the +210 volts at the center tap of the selected 0 track head winding 186 through the respective diode circuits and back to the +195 volts at the center tap of the read amplifier transformer primary winding 191. Because of the continuous current flow through this circuit, relatively small signals of several millivolts caused by the motion of the recorded magnetic drum signal regions with respect to the magnetic heads 188, will produce in read transformer 190 a signal capable of operating the read amplifier circuits of FIG. 15, which are shown also in the logical reading circuits 178 of FIG. 7.

The organization of the B register circuits is shown in the logical diagram of FIG. 19. In general, the B register is used for speeding up operation during multiplication and division by recording the contents of the accumulator 10 times around the B register track so that the access of either the multiplicand or divisor words may be accomplished for each one-tenth of the drum rotation. A typical word as stored upon each drum sector is indicated by the waveform 19–202. This waveform typifies the words stored and used throughout the computer. As the drum rotates, the first decimal digit DP0, which represents the sign, is presented in each sector. The sign is represented by nine "1" pulses for negative sign and nine "0" pulses for a positive sign.

Between each decimal digit of nine recorded bits is a guard cell so that ten complete recording bit spaces are used for each decimal number. Next in succession after the sign digit DP0 is the least significant digit DP1 of the recorded word, which in this illustrative case is a two and is represented therefore by two pulses in the pulse count notation used throughout the system. Each decimal digit is then read in succession until the most significant digit DP12 is reached. For all computations the decimal point is fixed between the most significant digit DP12 and the next most significant digit DP11. Thus, in the B register track of the drum, the same word would be written in all ten sectors and therefore would be available at the reading head 19–188 with a read time of approximately 1.7 milliseconds for a drum revolution of 3,600 r.p.m.

Signals to and from the transducing head 19–188 are processed in the read-write circuit section 19–204 in the manner hereinbefore described. Separate output signals go to the accumulator register from the B register for both 0 and 1 recorded information as indicated by the notation BR–0 and BR–1. Since the B register is read only during multiplication or division, the "or" circuit 19–205 produces signals derived from the computer instructions for actuating the output gating circuits 19–206 and 19–207. This "or" circuit is constructed as shown in FIG. 19*a*, as are similar "or" circuits throughout the computer. Thus, by means of a positive pulse at any one or more of the diode anodes, the potential at the output terminal is raised due to conduction through the load resistor from the ground terminal. Coincidence of the multiply of divide instruction with information BR–1 or BR–0 on the B register and clock pulses ∼DE.U produce corresponding output signals which are sent to the accumulator. Therefore, during the receipt of clock pulses ∼DE.U, shown in FIG. 8, which occur during presentation of each of the recorded sectors of the B register, any recorded B register information is read out into the accumulator in response to a multiply or divide signal received at the input "or" circuit 19–205.

In order to write upon the B register, separate circuits of the type hereinbefore described are supplied for writing both the "1" and the "0" bits. The input information is taken from the accumulator loop or A register as designated by the input notation AR–1 and AR–0. In the partial digit distributor 3–88 is a flip flop circuit DD–1, which is used for distinguishing between the sign digit DP–0 and numerical digits DP–1 through DP–12. Thus, the DD–1 input signal is used to gate the loop input digits from the A register at the input write gating circuits 208 and 209. The sign is separately processed and stored in a sign control flip flop 3–86 which is designated AD–1. Therefore, the ∼DD–1 signal is used to gate the DP–0 digit containing the respective minus or plus signs of the words to be written at the proper digit time DP–0 at the respective write "1" and write "0" input leads to the read-write circuits 19–204.

An instruction signal BR designating the B register write operation is necessary at the control gate 19–210 in order to permit writing upon the B register drum track. In coincidence with the B register control instruction BR, the computer must be in operating state 4 in order to permit writing upon drum. State 4 starts with the B timing or flag pulse, shown in FIG. 8. Thus, in order to arrive at state 4 the B timing pulse is used to change the control to state 4 in coincidence with a state 1 condition and a write B register instruction BR at the state control gate 19–211. The next B pulse after the end of the full revolution which permits the entire word in the accumulator to be written upon the B drum, utilizes a further state control gate 212 to change the computer state to the 0 idling state. Accordingly, state 4 both starts and ends with successive B pulses. The word is written entirely around the B register, and is retained in the accumulator for further use. In this manner information processed in the accumulator loop may be entered upon the B register for use in connection with the multiplication and division computations.

The manner in which information is selected from or read into the rotating magnetic memory is illustrated in FIG. 20. By means of the pinboard or manual control panel the 10's digit is selected as diagrammatically shown by switch 3–87 in the manner shown in connection with the more detailed circuit embodiment of FIG. 18. Likewise, the units selector switch 3–89 indicates the pinboard conditions which are used to cause the computer to select a particular sector of the selected memory track. Some of the circuits of FIG. 20 are cross referenced to other figures embodying detailed diode control circuits, from which complete operating circuits may be traced.

In order to produce the sector address, the address counter VI (3–75) is utilized, and is provided with four preset input connections to the different counter stages in order to allow for storing the selected memory sector condition. The counter VI is cleared during state 0 for all instructions. At the end of state 1, as determined by the combined B timing pulse and state 1 signal at the corresponding "and" circuits 325, the unit selector 3–89 serves to set up the 10's complement of the units position into counter VI. Thus, each word pulse W at the input gate circuit 324 counts the counter VI, so that at the count of nine the output gating circuits 326 may cause the state selector circuits to go into the read or write states. Thus, for each of the unit levels UL–1 through UL–9, the complementing encoder matrix 20–350 converts the units level to the 10's complement for input at the respective counter stages. The corresponding units level indication is converted to the binary preset signal for counter VI (3–75). Thus, the state selector will be controlled by address counter VI to effect reading or writing on the magnetic drum 3–51 only during the presence of the selected units sector as it occurs during the rotation cycle.

In general, the voltages defining the instructions to be carried out are ground signals going into the diode system at the pinboards as controlled by the scanning switches. The flip-flops and counter circuits each use pulse amplifiers of the type hereinbefore mentioned to drive the diode system. In using output signals from the diode system, they are sampled with timing signals of two microsecond width, termed chopper pulses TvU, as seen from FIG. 8. These pulses are gated against a flip flop signal to produce high current pulses. The inhibit pulses, when required, are available at one output winding of the pulse transformer. In general, the diode circuits are designed to use as few intermediate flip flop or pulse amplifiers as possible, even though more diodes may be required in some circuits than otherwise.

The diode circuits are presented in such form that they may be mounted readily upon plug-in panels for circuit interconnection.

The read drum instruction, when pinned R *ab*, transfers a word from the memory location specified in the instruction *ab* to the accumulator 3–59, first clearing the accumulator. During state 1 the 10's digit of the address selects a track on the drum 3–51. The following B pulse sets the ten's complement of the units digit of the address into counter VI (3–75) and changes control to state 7. During state 7 the accumulator is cleared and W pulses are counted into counter VI until address coincidence is found, at which time control changes to state 4. During the sign digit time DT–0 of state 4, the sign of the memory word is stored in flip flop 3–86, designated A–1 and the numerical portion of the memory word is read into the accumulator during the digit times DT–1—DT–12. A W pulse then changes the control back to state 0.

The write drum instruction, when pinned W *ab*, transfers a word from the accumulator to the specified memory location and leaves a copy of the word in the accumulator. During state 1 the 10's digit of the address selects a track on the drum. The following B pulse sets the ten's complement of the units digit of the address into counter VI and changes control to state 2. During state 2, W pulses are counted into counter VI until address coincidence is found. Then control changes to state 4. During the sign digit time DT–0 of state 4, the accumulator sign stored in flip flop A–1 is written on the drum and the remaining digits are synchronously sent to the drum, after which the next W pulse changes the control back to the idling state 0.

The B register write instruction, initiated by pinning a B in the first pinboard section, writes the accumulator contents around the B register track 3–52 ten times, leaving a copy of the word in the accumulator. The B pulse at the end of state 1 changes control to state 4, as may be seen in FIG. 19. During each sign time DT–0 the sign of the word in the accumulator, as stored in flip flop AD–1, is written on the B register track, and during digit times DT–1—DT–12 digits of the word are written on the B register. The next B flag pulse changes control to the idling state 0. Thus, state 4 starts and ends with a B pulse permitting the accumulator contents to be written on the B register ten times. If the most significant digit D–12 is not zero during state 4, the alarm light 3–57 is fired and flip flop CN–4 (not shown) is reset; this safeguards against overflow products.

For additional instructions as well as a complete understanding of a computer into which this invention may be incorporated, reference is had to said United States application Ser. No. 604,153, now U.S. Patent No. 3,144,549, from which this application is divided. The additional teachings of that parent application are incorporated herein by reference.

It is evident from the foregoing specification that an improved electronic computer system is afforded having many advantages over prior art computer systems. Accordingly, those novel features descriptive of the improvements afforded to the art by the invention are defined with particularity in the following claims.

We claim:

1. A system for producing periodic computer timing signals from discrete spaced signals recorded on a cyclically movable carrier comprising in combination, means for reading the signals from the movable carrier, an amplifier having a high Q resonant circuit tuned to the cyclic presentation frequency of the signals and coupled to the reading means for producing amplification gain enhanced by the resonant circuit gain and for reducing extraneous noise pulses introduced into the reading means by filtering out pulse components at non-resonant frequencies and thereby producing output timing signal pulses solely in response to oscillations of the resonant circuit at the pulse frequency and timing designated by the recorded signals, means for advancing the phase of the output timing signal pulses, and means for shaping the phase advanced signals for producing timing pulses having a leading edge occurring at an advanced phase position.

2. In an electronic digital computer system, a source of cyclically presented synchronizing signals having a plurality of channels, at least one means in the source for presenting at a single signal channel a plurality of intermixed sets of synchronizing signals for control of different computer circuits, at least one other means in the signal source for presenting a further set of synchronizing signals at another channel for use in the computer circuits and having a synchronously timed relationship with one of the intermixed sets of signals, a circuit coupled to said single channel for amplifying and shaping the intermixed sets of signals, a circuit coupled to the other means for amplifying and shaping the further set of synchronizing signals, and coincidence gating means coupled to said circuits for comparing the two sets of amplified signals to produce output signals representative of of only said one of the intermixed sets of synchronizing signals, whereby said single channel of the signal source may be used for a plurality of sets of control signals.

3. In a timing signal generation system in which there is a timing track recorded on a cyclical recording medium, said timing track carrying a set of periodically recurrent signals and flag signals interspersed with respect to said periodically recurrent signals, the combination of means generating a signal train corresponding to the recorded signals on said timing track, means generating a series of electrical signals identifying locations of said cyclical storage medium in response to said periodically recurrent signals appearing in said timing track, and means generating a signal identifying a reference origin of said cyclical recording medium in response to said flag signals.

4. A system for generating a plurality of sets of timing signals in response to signals derived from a single channel of a storage medium, in which there is recorded a set of periodically recurrent timing signals and at least one set of flag signals interspersed with respect to said periodically recurrent signals, including in combination means generating a signal train corresponding to the signals recorded in said single channel of said storage medium, a first gate connected to said signal generator for passing signals corresponding to said recorded periodically recurrent signals only, a second gate coupled to said signal generating means, and means opening said second gate in response to at least one of said sets of flag signals.

5. In an electronic computer system having a movable magnetic memory device with data stored therein in serial form and further having a plurality of recording channels each with a plurality of unit data storage locations, data storage location address means comprising, a plurality of read-write heads each associated with a different one of said recording channels, a switching selector matrix coupled to said heads for selecting a particular one of said heads for writing data on and reading data from its associated channel, a source of clock pulses including a word clock track having a single transducer for deriving word clock pulses synchronized with the movement of said movable magnetic memory device, a pulse discriminating means operatively coupled to said selector matrix and to said source of clock pulses through a preset overflow counter for selectively providing, in conjunction with the movement of said memory device, a signal for causing a selected read-write head to perform a data read-write operation in one or more of the unit data storage locations on the recording channel associated with the selected head.

6. In an electronic digital computer system as defined in claim 2, a third timing means in the signal source for presenting raw timing pulses, a circuit coupled to said third timing means generating phase advanced timing pulses, an AND gate included within said coincidence gating means receiving said phase advanced timing pulses and signals from the further set of synchronizing signals to thereby relate said output signals to said raw timing pulses.

7. In an electronic digital computer system as defined in claim 2, a third timing means in the signal source for presenting raw timing pulses, a circuit coupled to said third timing means generating interspersed timing pulses, coincidence gating means receiving said interspersed timing pulses and signals derived from said further set of synchronizing signals, further coincidence gating means coupled to the outputs of said last named gating means and to said single channel to produce output signals representative of other than said one of the intermixed sets of synchronizing signals to thereby provide additional synchronized conrol signals.

8. A system for producing two sets of computer timing pulses from a single set of cyclically presented raw signals spaced upon a movable memory element in an electronic computed system comprising tuned amplifier means converting the raw signals to an oscillatory sine wave signal at the cyclic presentation frequency, means partially shaping the sine wave signal to produce relatively narrow sine wave peaks, parallel circuit channels electrically connected to said partial signal shaping means, and means inverting the partially shaped signals in one of said channels and shaping both the inverted and non-inverted partially shaped signals to produce two interspersed sets of timing signals of one polarity.

9. A system for producing computer timing pulses from cyclically presented raw signals spaced upon a movable memory element in an electronic computer system comprising tuned amplifier means converting the raw signals to a sine wave signal at the presentation frequency, means partially shaping the sine wave signals to produce relatively narrow sine wave peaks, means inverting the partially shaped signals in one of two signal channels, means shaping both the inverted and non-inverted partially shaped signals in final form to produce timing signals, and means combining the interspersed timing signals to produce composite timing signals at twice the basic frequency of the raw signals.

10. In an electronic computer system as recited in claim 5, circuit means coupled to a single timing channel of said movable magnetic memory device providing a plurality of intermixed sets of synchronizing signals of at least a first and a second timed relationship with respect to said unit data storage locations, said synchronizing signals of said first timed relationship serving as said clock pulses, and write state means responsive to said synchronizing signal of said second timed relationship to enable a selected head to perform a data write operation in one or more of the selected unit data storage locations on the magnetic memory device.

11. A system as defined in claim 4 including a third gate connected to said signal generating means and means opening said third gate in response to a single flag signal whereas said second gate is opened in response to a different single flat signal, and whereby said three gates are opened at separate times.

12. A system as defined in claim 3 wherein said means generating signals in response to said periodically recurrent signals includes a gate receiving further timing signals derived from at least one other timing track.

13. A system as defined in claim 12 wherein said means generating a signal identifying a reference origin of said cyclical recording medium includes a further gate receiving still further timing signals derived from at least one other timing track.

14. A system as defined in claim 4 wherein said first and second gates are AND gates and wherein they receive further clock and inverted clock signals respectively derived from another channel of said storage medium.

15. A system as defined in claim 15 wherein said clock and inverted clock signals are generated from separate secondary windings of a pulse transformer, each being clamped to different operating voltage levels.

16. A system for producing periodic computer timing signals comprising, in combination, a cyclically movable carrier having a number of timing tracks, a first transducer coupled to a first said track providing raw timing pulses, a second transducer coupled to a second said track providing a lesser number of synchronizing signals, a third transducer coupled to a third said track providing intermixed sets of synchronizing signals, said signals from said second transducer being synchronously timed with only one of the intermixed sets of signals generated by said third transducer, and means gating signals from said first transducer and signals from said second transducer in a direct and an inverted fashion, respectively, with signals from said third transducer to isolate the said respective intermixed sets of signals.

17. In an electronic computer system having a movable magnetic memory device with data stored therein in serial form and further having a plurality of recording channels each with a plurality of unit data storage locations, data storage location address means comprising, a plurality of read-write heads each associated with a different one of said recording channels, a switching selector matrix coupled to said heads for selecting a particular one of said heads for writing data on and reading data from its associated channel, a source of clock pulses synchronized with the movement of said movable magnetic memory device, a pulse discriminating means operatively coupled to said selector matrix and to said source of clock pulses for selectively providing, in conjunction with the movement of said memory device, a signal for causing a selected read-write head to perform a data read-write operation in one or more of the unit data storage locations on the recording channel associated with the selected head.

18. In an electronic computer system having a movable magnetic memory device with data stored therein in serial form and further having a plurality of recording channels each with a plurality of unit data storage locations, data storage location address means comprising, a plurality of read-write heads each associated with a different one of said recording channels, a switching selector matrix coupled to said heads for selecting a particular one of said heads for writing data on and reading data from its associated channel, a source of clock pulses including a word clock track having a single transducer for deriving word clock pulses synchronized with the movement of said movable magnetic memory device, a pulse discriminating means operatively coupled to said selector matrix and to said source of clock pulses for selectively providing, in conjunction with the movement of said memory device, a signal for causing a selected read-write head to perform a data read-write operation in one or more of the unit data storage locations on the recording channel associated with the selected head.

References Cited

UNITED STATES PATENTS

| | | | |
|---|---|---|---|
| 2,540,654 | 2/1951 | Cohen et al. | 235—61 |
| 2,789,224 | 4/1957 | Leonard | 250—36 |
| 2,800,642 | 7/1957 | May | 340—174 |
| 2,819,457 | 1/1958 | Hamilton et al. | 340—253 |
| 2,877,450 | 3/1959 | Hamilton et al. | 340—174 |
| 2,877,676 | 5/1959 | Hamilton | 340—174 |
| 2,895,123 | 7/1959 | Foster et al. | 340—174 |
| 3,063,052 | 10/1962 | Bird et al. | 340—174.1 |

ROBERT C. BAILEY, *Primary Examiner.*

I. S. KAVRUKOV, *Assistant Examiner.*

UNITED STATES PATENT OFFICE

CERTIFICATE OF CORRECTION

Patent No. 3,374,462 March 19, 1968

Donald T. Best et al.

It is certified that error appears in the above identified patent and that said Letters Patent are hereby corrected as shown below:

In the heading to the printed specification, lines 10 and 11, cancel "Claims priority, application Great Britain, Mar. 2, 1956, 6,693/56".

Signed and sealed this 13th day of January 1970.

(SEAL)
Attest:

Edward M. Fletcher, Jr.
Attesting Officer

WILLIAM E. SCHUYLER, JR.
Commissioner of Patents